United States Patent [19]
Barton et al.

[11] 3,979,229
[45] Sept. 7, 1976

[54] TEMPERATURE MEASURING DEVICE HAVING A DEFORMABLE TEMPERATURE SENSING HEAD THEREOF

[75] Inventors: Serge P. Barton, Wallingford, Pa.; William R. Berry, Camden, N.J.

[73] Assignee: Westinghouse Electric Corporation, Pittsburgh, Pa.

[22] Filed: June 20, 1974

[21] Appl. No.: 481,270

[52] U.S. Cl. ............................... 136/232; 136/221; 136/230; 136/242
[51] Int. Cl.² ............................................ H01V 1/04
[58] Field of Search ............ 136/221, 230, 232, 242

[56] References Cited
UNITED STATES PATENTS

| | | | |
|---|---|---|---|
| 2,000,489 | 5/1935 | Lederer | 136/229 |
| 2,202,533 | 5/1940 | Mason | 136/242 |
| 2,560,455 | 7/1951 | Knight | 136/242 |
| 2,829,185 | 4/1958 | Macatician et al. | 136/230 |
| 3,473,968 | 10/1969 | Rinesch et al. | 136/230 |
| 3,751,305 | 8/1973 | Huebscher | 136/221 |
| 3,811,958 | 5/1974 | Maurer | 136/242 |

*Primary Examiner*—Nelson Moskowitz
*Attorney, Agent, or Firm*—G. H. Telfer

[57] ABSTRACT

A temperature measuring device for electrically measuring the temperature at a predetermined point within a body member is disclosed. The device comprises a temperature sensor electrically isolated within a metallic sheath, the sheath being securely attached to a deformable mounting head. The head is deformed to produce a gripping force to intimately hold it in position within a cavity disposed in the body member and to maintain the sensor in a temperature sensing relationship with the predetermined point of interest. A spacer member is provided to substantially fill the remainder of the cavity to prevent distortion of the temperature field. A deformable lip is disposed about the periphery of the cavity which overlaps the spacer member and provides a holding force to assist in maintaining the sensor in position.

6 Claims, 2 Drawing Figures

TEMPERATURE MEASURING DEVICE HAVING A DEFORMABLE TEMPERATURE SENSING HEAD THEREOF

BACKGROUND OF THE INVENTION

1. Field of the Invention

This invention relates to temperature measuring devices, and, in particular, to temperature measuring devices having deformable mounting heads thereon.

2. Description of the Prior Art

It is often important to those in the art of power generation to accurately ascertain the temperature of the metal of the power generation apparatus or of the motive fluid utilized therein. The motive fluid, commonly steam, is confined within a casing member to convert the energy carried in the steam into useful mechanical work. The casing may itself be surrounded by one or more concentric outer casing members.

In order to ascertain the temperatures within the metal of the inner casing member or the temperature of the motive fluid contained therein, it is necessary to provide temperature measuring devices disposed at various predetermined points within the casing or within the motive fluid flow. There are, in general, two main types of devices available for obtaining the temperature at a predetermined point within the inner casing of a turbine apparatus. The casing is usually swept by a flow of high velocity fluid over both its interior and exterior surfaces. The first type of device comprises a temperature sensor, usually a thermocouple junction, encased in a metallic sheath. The sensor used in this type of device may or may not be electrically isolated from the casing. The second type of device comprises only unsheathed thermocouple junctions which are electrically in contact with the casing whose temperature is being measured.

One arrangement which exemplifies the first type of device requires the provision of aligned bores, one of which extends completely through the outer casing and the other extending a predetermined distance into the metal used to fabricate the inner casing. An elongated, hollow protective tube, having a closed end thereon, extends into the aligned bores provided in the casings and through the annular space therebetween. The thermocouple junction is inserted into the protective tube to a point adjacent to, but not in contact with, the closed end thereof. The temperature measured by the junction is monitored and recorded by suitable external instrumentation.

There are often considerable errors, however, in the temperature measurements obtained by this arrangement. Such errors are due to distortions in the temperature field created by the cavity provided for the device. In addition, layers of stagnant fluid surrounding the end of the thermocouple sheath and the end of the protective tube contribute to the measurement errors. Besides measurement errors, complications involved in the installation of the aligned bores, plus undesirable shop disruptions the process entails, makes this arrangement economically disadvantageous. A similar arrangement, used to measure the temperature of the steam flow within the inner casing, suffers from the same disadvantages.

An alternative arrangement exemplifying the first type of devices disposes a bore within the material of the inner casing, the bore terminating adjacent the point of interest. The thermocouple junction is then inserted into the bore. The junction is maintained near to, but not touching, the bottom of the bore by the gripping action of a fitting rigidly holding the sheath in place. The fitting is, in turn, threaded into a boss protruding from the surface of the casing. The measurements obtained by the thermocouple junction are often misleading, however, since the junction is not disposed in contact with the casing and since the substantially unfilled void distorts the basic temperature field.

A third example of the first type of devices, similar to the second example described above, disposes the thermocouple junction within a bore in the inner casing member, and maintains the junction in contact with the casing with a spring loaded retainer. A bulky housing, which protrudes above the exterior surface of the inner casing, houses the retainer. This scheme may only be used, of course, where there is available a sufficiently large annular space between casings in which to dispose the housing. Such a housing would, of course, interfere with the fluid flow within the annular space.

This arrangement is also disadvantageous since there is still present a substantially unfilled cavity which disrupts the temperature field. Further, vibrations may be transmitted through the spring mounting to the junction, resulting in premature failure of the temperature measuring device. The provision of the threaded connection, moreover, and the boss which must be provided to maintain the threads above the stress field of the casing, entail undesirable fabrication complications.

The second main type of devices for obtaining the temperature of a predetermined point are best exemplified by Macatician, U.S. Pat. No. 2,829,185; Kanne, U.S. Pat. No. 2,856,341; Lederer, U.S. Pat. No. 2,000,489; and States, U.S. Pat. No. 2.012,112. These patents all disclose unsheathed thermocouple junctions which are electrically in contact with the body member whose temperature is being measured.

These devices all exhibit the drawback of having the junction grounded to the body member. Such a configuration leads to the possibility of spurious electrical currents which distort the measurements obtained. Also, these devices are limited only to the use of thermocouple junctions as the temperature sensors. All these devices have a mechanically or a metallurgically undesirable connection between the body and the device, either at the mouth of the bore or in the bore itself. All of these devices exhibit a construction which is fragile and unable to withstand buffeting by the fluid flow which sweeps along the external surface of the inner casing, and, for this reason, are inapplicable to the problem at hand. Further, all devices shown in the above Patents are susceptible to unacceptable temperature measurement errors. Macatician, for example, leaves a vacant gap around the sensing junction which tends to disturb the temperature field. Kanne also leaves a substantially unfilled gap around his sensing junction. Lederer, on the other hand, surrounds his device with a material different from the material of the body whose temperature is being measured. Also, his sensing junction is unsuitable for measuring internal metal temperatures since the large surface areas exposed by his device will be adversely affected by the temperature of the fluid flow sweeping over the external surface of the casing. It is to be noted, in this regard, that States is particularly unsuited for any mechanical temperature measurement application.

It is apparent that the prior art arrangements for measurement of the temperature of the metal casing are inadequate. A temperature measuring device that provides accurate measurement of the temperature at a predetermined point within the casing or when inserted into the fluid flow itself is a prime requisite. Further, the presence of unfilled voids which distort the temperature field must be avoided. The measurement device must be in intimate contact with the body at the point at which the temperature measurement is desired in order to avoid measurement errors. The device must also be securely fastened to the innermost casing so as to be able to withstand the battering imposed thereon due to the fluid flow sweeping over the external surface of the inner casing. At the same time, however, the attachment must not unduly stress the casing. The device must also be ruggedly constructed to withstand the forces imposed thereon if immersed in the fluid flow confined within the casing. The sensor must be electrically isolated from any extraneous electrical currents which may distort the measurements obtained.

SUMMARY OF THE INVENTION

A temperature measuring device for electrically measuring the temperature at a predetermined point within a body member is disclosed. The measuring device comprises a temperature sensor surrounded by electrical insulation and disposed within a metallic sheath. The sheath is securely attached to a deformable mounting head. The mounting head is deformed to produce a gripping force to intimately hold it within a cavity provided within the body and to dispose the sensor in a temperature sensing relationship with the predetermined point of interest therein. A spacer member, fabricated of the same material as the mounting head and the body, is provided within the remainder of the cavity to eliminate thermal distortions engendered by void spaces within the body. A deformable lip is provided on the body adjacent the cavity which, when deformed, provides a holding force to assist the gripping force produced by deforming the mounting member to maintain the sensor in position within the cavity.

It is an object of this invention to provide a temperature measuring device to accurately measure the temperature at a predetermined point within a body member or the temperature of a fluid flow confined within that body. It is a further object of the invention to electrically isolate the temperature sensor disposed within the device to eliminate distortion in measurements due to extraneous electrical currents. It is a still further object to provide a deformable mounting head securely attached to the sheath containing the electrically isolated temperature sensor and to deform that mounting head to maintain the sensor in a temperature sensing relationship with the point of interest and to ensure intimate contact between the head and the body. It is still another object of this invention to provide a spacer element fabricated of the same material as the body to eliminate distortions of the temperature field therein. It is also an object to provide a sensor that is securely fastened to the exterior surface of the inner casing of a turbine apparatus so as to withstand the buffeting imposed thereon by the fluid flow sweeping thereover, yet not unduly stress the casing. By providing a deformable mounting head surrounding the sheath containing the electrically insulated temperature sensor, it is an object to protect the sensor from forces imposed thereon during direct immersion of the sensor into the fluid flow confined within the body. Other objects and advantages of the invention over the prior art will become clear in the detailed description of the preferred embodiment which follows herein.

BRIEF DESCRIPTION OF THE DRAWINGS

The invention will be more fully understood from the following detailed description of the preferred embodiment, taken in connection with the accompanying drawings, in which.

DESCRIPTION OF THE PREFERRED EMBODIMENT

Figure 1:
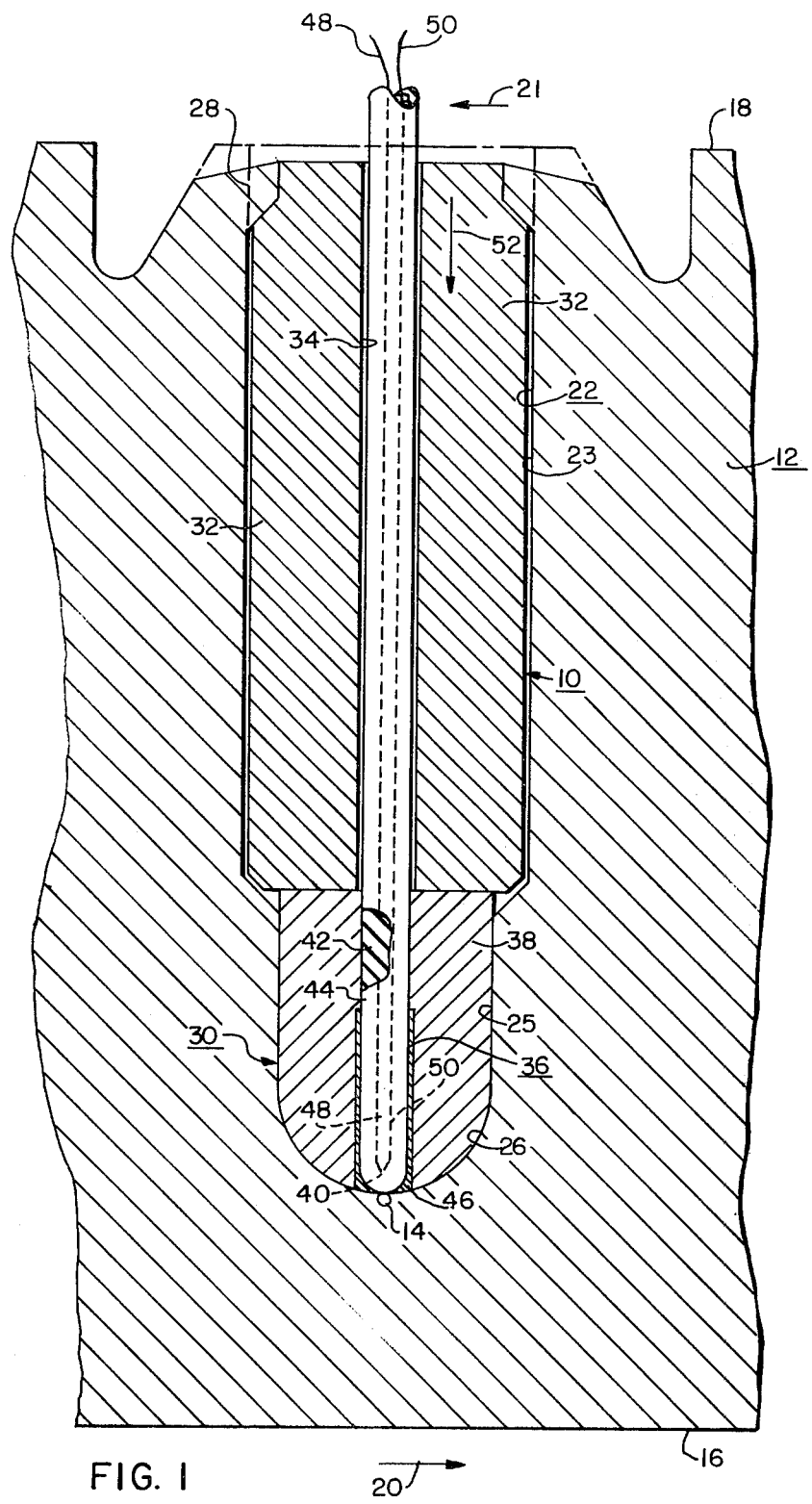
FIG. 1 is an elevational view, substantially in section, of a temperature measuring device embodying the teachings of this invention mounted in a body member adjacent a predetermined point of interest; and, FIG. 2 is a view similar to FIG. 1, of a temperature measuring device embodying the teachings of this invention immersed in a fluid flow.

Throughout the following description, similar reference characters refer to similar elements in all Figures of the drawings.

FIG. 1 illustrates an elevational view, substantially in section, of a temperature measuring device, generally indicated by reference numeral 10, embodying the teachings of this invention. The temperature measuring device 10 is mounted within a body member 12, the temperature of which at a predetermined point 14 therein is sought to be measured. As shown in FIG. 1, the body 12 represents a portion of the inner casing of a steam turbine apparatus, and, as such, has an interior surface 16 and an exterior surface 18 thereon. Both the interior surface 16 and the exterior surface 18 of the casing 12 are swept by a flow of high pressure, high temperature steam, the steam flow being illustrated by reference arrows 20 and 21, respectively. The exterior surface 18 of the casing 12 is usually radially adjacent to a concentrically disposed outer cylinder (not shown). Although FIG. 1 illustrates the temperature measuring device 10 in the context of a steam turbine apparatus, it is to be understood that the device 10 embodying the teachings of this invention may be disposed within any body member to electrically measure the temperature at any predetermined point therein.

It is often of interest to those in the steam turbine art to accurately ascertain the temperature of one or more points within the metal casing 12 or the temperature of one or more points within the steam flow. It is well known to those versed in this art that there are, generally, significant temperature variations within the metal of the casing and within the steam itself.

The measuring device 10 embodying the teachings of this invention is securely attached, in a manner to be more fully described herein, within a bore 22 which extends from the exterior surface 18 of the casing 12 to a termination point just adjacent the point of interest 14 within casing 12. As seen in FIG. 1, the bore 22 does not extend completely through the casing 12, but instead has a cylindrical portion 23 extending almost the entire distance into the casing 12 and terminating in a reduced cylindrical portion 25 and a hemispherical portion 26 in the vicinity of the point of interest 14. A deformable lip 28, shown in dashed lines in FIG. 1, is initially provided at the mouth of the bore 22 near the exterior surface 18. The lip 28 is deformed, as shown by the solid lines in FIG. 1, in a manner more fully described herein.

The device 10 for electrically measuring the temperature of the predetermined point 14 within the casing 12 generally comprises a temperature sensing head, indicated by reference numeral 30, and a spacer element 32 having a central axial bore 34 therethrough. The spacer element 32 is fabricated of material substantially similar to the material used to fabricate the casing 12, and is of a dimension substantially equal to the length of the cylindrical portion 23 of the bore 22.

The temperature sensing head 30 itself comprises a temperature sensing element 36 securely mounted within a deformable mounting head 38. The temperature sensing element 36, in turn, comprises a temperature sensor 40, surrounded by an electrical insulating material 42 disposed within a protective metallic sheath 44. As mentioned, the sheath 44 is securely affixed to the deformable mounting head 38 by suitable attchment, such as a high temperature braze 46, to intimately attach the temperature sensor 40 disposed within the sheath 44 to the deformable mounting member 38.

The deformable mounting head 38 is fabricated of a material substantially similar to the material used to fabricate the casing 12, and therefore, to the material used to fabricate the spacer element 32. Although FIG. 1 illustrates the temperature-sensor 40 as being a thermocouple junction, it is to be understood that any suitable sensor apparatus, such as a Resistance Temperature Detector (RTD) may be used in the place of the thermocouple junction as the temperature sensor 40. The thermocouple junction sensor 40 is surrounded by the electrical insulation material 42 in order to prevent any extraneous electric currents produced within the system from distorting the temperature readings detected by the thermocouple junction sensor 40.

As is well known to those versed in the art of electrical temperature measurements, the thermocouple junction sensor 40 contains a junction of two dissimilar metallic wires, for example, one element 48 fabricated of Chromel alloy and a second element 50 fabricated of Constantan alloy. As seen in FIG. 1, the first and second elements 48 and 50, respectively are surrounded at all points by the insulation 42 and the protective sheath 44 as the elements extend rearwardly from the thermocouple junction sensor 40.

The exterior surface of the deformable mounting head 38 is machined to conform to the cylindrical bore 25 and the hemispherical portion 26 of the bore 22 adjacent the predetermined point of interest 14 whose temperature is being sought. In FIG. 1, this is a hemispherical surface, although it is to be understood that the device 10 is not restricted to such a shape. The deformable mounting head 38 (having the thermocouple junction sensor 40 therein) is inserted by suitable means into the extreme end 26 of the bore 22. The deformable mounting head 38 is then deformed by suitable means so as to bring it into intimate contact with both the cylindrical portion 25 and the hemispherical end 26 of the bore 22. More specifically, by deforming the mounting member 38, the thermocouple junction sensor 40 is brought into a temperature sensing relationship with the body 12 in the vicinity of the predetermined point of interest 14. The deformable mounting head, in its deformed state, produces a gripping force within the cylindrical bore 25 acting to hold the thermocouple junction sensor 40 in its temperature sensing relationship with the body 12 near the point of interest 14.

After deformation of the mounting head 38, the spacer 32 is inserted into the cylindrical portion 24 of the bore 22 so that the spacer 32 abuts the rearward side of the mounting head 38. The protective sheath 44 extending from the mounting head 38 extends through the central cavity 34 in the spacer 32 and connects to an external electrical circuit (not shown). The lip 28 is then deformed to occupy the position shown in solid lines in FIG. 1. The deformed lips 28 impart a force acting in direction 52 transmitted by the spacer 32 into the deformed mounting head 38 to assist the gripping force to secure the thermocouple junction sensor 40 in position.

It may thus be appreciated that the temperature measuring device 10 embodying the teachings of this invention overcomes all the disadvantages of the prior art. By providing the electrical insulation 42 about the sensor 40, the sensor 40 is completely isolated from extraneous electrical currents which distort measurements obtained in prior art devices. Similarly, provision of an intimately attached deformable mounting head 38, and an adjacent spacer 32 fabricated of the same material as the body member 12 eliminates distortions to the thermal field occasioned by large void spaces in prior art devices.

The gripping force generated by deformation of the mounting member 38 and the holding force produced by deformation of the lip 28, maintain the sensor 40 in intimate contact with the body at the point 14 where the temperature is sought, eliminating the errors in the prior art devices associated with lack of contact. The fastening of the device 10 on the exterior surface 18 provides a rugged, relatively stress-free arrangement for retaining the device 10 in the presence of vibration and buffeting forces arising from the high velocity flow 21 sweeping over the surface 18.

Figure 2:
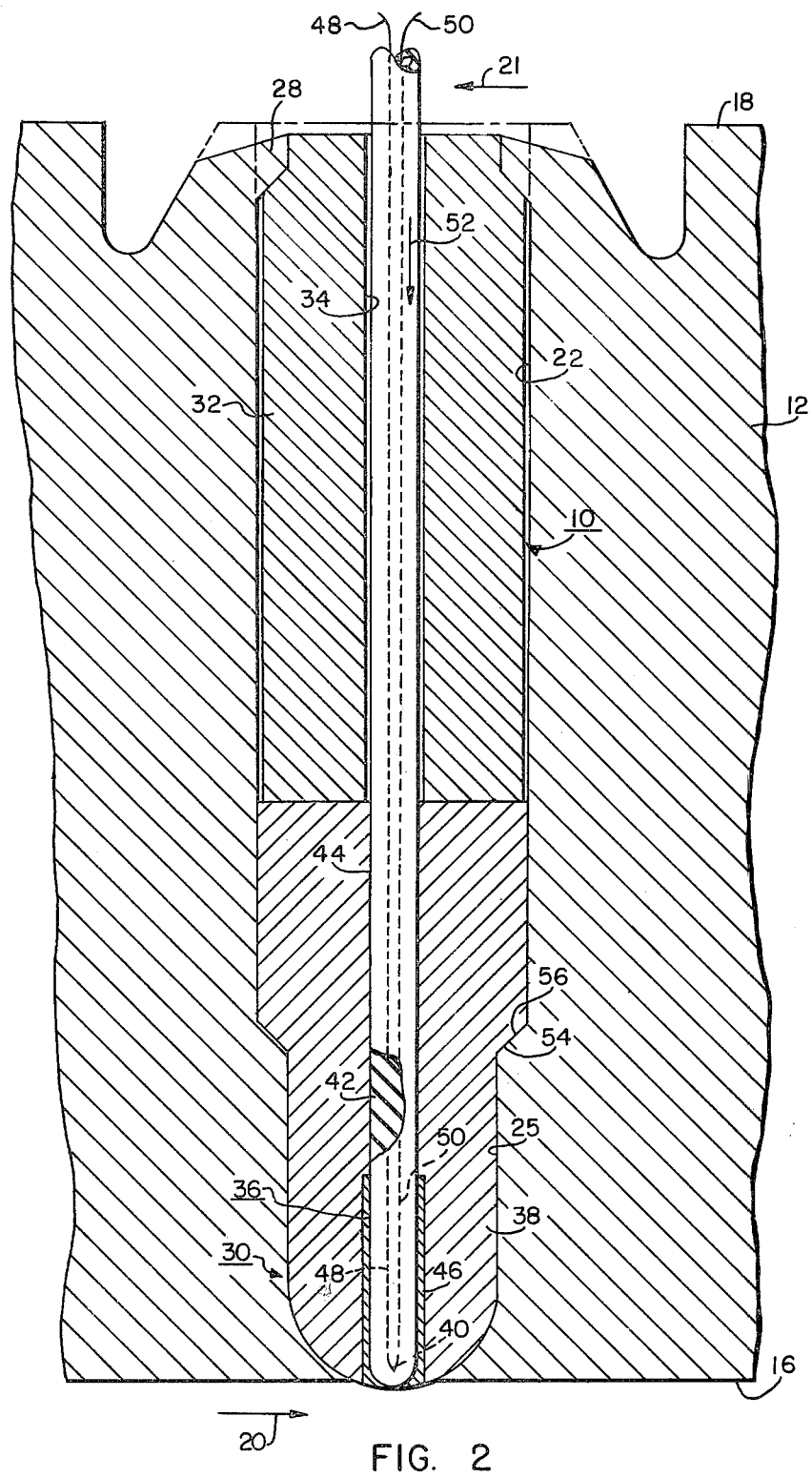

As will be more apparent in FIG. 2, the intimately attached deformable mounting head 38 serves to protect the sensor 40 from vibrational shocks and forces which may be imposed upon the sensor 40 by the high velocity flow 20 sweeping over the interior surface 16. Such protection is especially useful when the device 10 is utilized as embodied in FIG. 2.

FIG. 2 illustrates a modification of the basic device in which the end 26 of the bore 22 is shown as breaking through the interior surface 16 of the casing 12. Thus, the bore 22 communicates with both the interior and exterior of the casing 12. The device 10 embodying the teachings of this invention is shown, in FIG. 2, as being immersed directly into the fluid flow illustrated by reference arrow 20.

In order to secure the sensor 40 in position within the steam flow 20, ledges 54 are provided within the bore 22. These ledges 54 engage a shoulder 56 disposed on the exterior of the deformable mounting head 38, and the abutment therebetween secures the mounting head 38 in the illustrated position. With the gripping force and the holding force provided by deformation of the mounting member 38 and the lip 28, respectively, the abutment between the ledge 54 and the shoulder 56 insures that the sensor 40 will remain in its temperature sensing relationship with the steam flow 20. There are situations when only the holding force generated by deformation of the lips 28 is necessary, and, therefore, the head 38 will not be appreciably deformed.

It is apparent that no prior art temperature measuring device, including those described in U.S. Pat. Nos. 2,000,489 issued to Lederer, 2,829,185 issued to Macatician, 2,856,341 issued to Kanne, or 2,012,112 issued to States, show, teach or describe devices described herein. The temperature measuring device embodying the teachings of this invention is a novel, useful, and unobvious arrangement which accurately provides temperature measurements while overcoming all mentioned disadvantages of the prior art.

We claim as our invention:

1. A temperature measuring device for electrically measuring the temperature at a predetermined point within a body, said device comprising:
   a temperature sensor,
   a metallic sheath surrounding said sensor, said sheath having a closed terminus within which said temperature sensor is disposed,
   an insulating member surrounding said sensor and disposed within said sheath to electrically isolate said sensor from said sheath,
   a mounting head intimately attached to said sheath so as to enclose said terminus thereof, while disposing said sensor in a temperature sensing relationship with said predetermined point in said body,
   said body having a cavity therein, said cavity terminating in a predetermined shape adjacent said predetermined point,
   said mounting head being fabricated of the same material as said body and conforming substantially to said shape of said cavity adjacent said point by deformation of said head to generate a gripping force maintaining said sensor within said cavity and in said temperature sensing relationship with said predetermined point,
   a spacer element disposed to completely fill the remainder of said cavity and abutting said mounting head, said spacer completely surrounding said sheath as said sheath extends from its intimate contact with said head to prevent thermal distortion within said cavity, said spacer also being fabricated of the same material as said body,
   a lip at a surface of said body immediately adjacent said cavity, said lip being deformed onto said spacer and imposing a holding force transmitted by said spacer to said mounting head to augment said gripping force to maintain said sensor in said temperature sensing relationship with said predetermined point within said body.

2. A device for electrically measuring the temperature of a fluid flowing within a body member, said body member having a cavity communicating with said flow, said device comprising:
   a temperature sensor,
   a metallic sheath surrounding said sensor,
   an insulating member surrounding said sensor and disposed within said sheath for electrically isolating said sensor from said sheath,
   a deformable mounting head intimately attached to said sheath and being fabricated of the same material as said body member, said head being deformed to generate a gripping force to maintain said sensor in a temperature sensing relationship within said fluid flow, said mounting head having a shoulder contacting an abutting portion of said body member to maintain said sensor within said cavity,
   a spacer element disposed within said cavity and abutting said deformable mounting head, said spacer being fabricated of the same material as said body, said spacer having an opening therein through which said sheath extends,
   a lip at a surface of said body immediately adjacent said cavity, said lip being deformed onto said spacer to impose a force transmitted by said spacer to said mounting head to assist in forming said gripping force and contact between said shoulder and said abutting portion of said body so as to maintain said sensor in said fluid flow.

3. The device of claim 1, wherein said sensor is a thermocouple junction.

4. The device of claim 1, wherein said sensor is a resistance temperature detector.

5. The device of claim 2, wherein said sensor is a thermocouple junction.

6. The device of claim 2, wherein said sensor is a resistance temperature detector.

* * * * *